C. F. HEINE.
PRIMARY INSTRUCTION BOARD.
APPLICATION FILED JAN. 3, 1920.
1,384,192. Patented July 12, 1921.
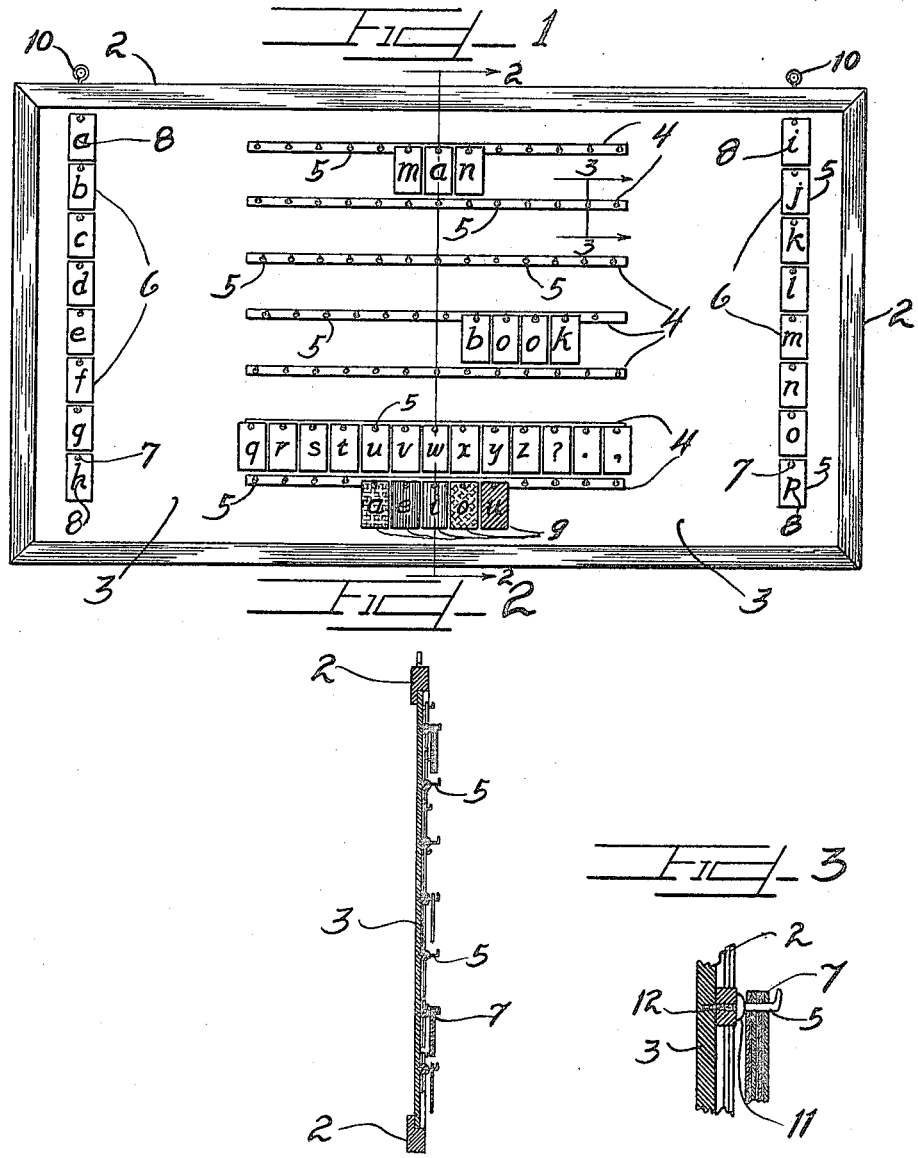

UNITED STATES PATENT OFFICE.

CHRISTIAN F. HEINE, OF HINCKLEY, ILLINOIS.

PRIMARY-INSTRUCTION BOARD.

1,384,192.          Specification of Letters Patent.     Patented July 12, 1921.

Application filed January 3, 1920. Serial No. 349,236.

*To all whom it may concern:*

Be it known that I, CHRISTIAN F. HEINE, a citizen of the United States, and a resident of the town of Hinckley, in the county of De Kalb and State of Illinois, have invented certain new and useful Improvements in Primary-Instruction Boards; and I do hereby declare that the following is a full, clear, and exact description of the same, reference being had to the accompanying drawings, and to the numerals of reference marked thereon, which form a part of this specification.

This invention relates to a primary instruction board adapted to be used in teaching the alphabet and first reading lessons to school children in the primary grades.

In modern teaching methods the process of visualization of the words and letters to be learned has come to be recognized as one of the most important factors in the foundation of a child's education. It is a fundamental idea of this theory of visualization to have the pupil associate the eye-image with the name and with the sound of the letters. As he progresses further the pupil is taught to build up the letters as learned into words, still associating the eye-image with the sound and meaning.

The visual process of teaching letters and building up words is uninteresting and impractical when ordinary handwriting on slates and blackboards is employed and the old fashioned lettered building blocks heretofore used have been too easily lost and too hard to arrange to make them of any great value for use in class instruction.

It is an object of this invention to provide an adjustable wall board upon which rows of letters may be removably secured in any arrangement or order desired.

It is another object of this invention to provide an instruction board having letters and characters removably secured thereto and having means for arranging the letters and characters in horizontal and vertical rows on the board.

It is a further object of this invention to provide an instruction board with letters and characters printed on cards or blocks which are adapted to be hung in rows on the board and with a set of vowel letters each of a distinctive color.

It is an important object of this invention to provide an instruction board having hooks secured on the face thereof and arranged in rows and having lettered cards or blocks provided with means adapting them to be hung on the hooks.

Other and further important objects of this invention will be apparent from the disclosures in the specification and drawings.

The invention (in a preferred form) is illustrated in the drawings and hereinafter more fully described.

On the drawings:

Figure 1 is a front elevation of an instruction board embodying the principles of this invention showing the manner of hanging the letters thereon.

Fig. 2 is a section on line 2—2 of Fig. 1.

Fig. 3 is a slightly enlarged fragmentary detail section showing a method of attaching a hook to the board and hanging lettered cards or blocks thereon.

As shown on the drawings:

The reference numeral 1 indicates an instruction board embodying the principles of this invention. This board comprises the frame members 2 and the panel 3, the front side of which is preferably painted green or covered with green cloth to minimize eye-strain.

Secured to the front side of the panel 3, by gluing or other suitable means, are the horizontal strips 4, on which are arranged regularly spaced screw hooks 5. At each end of panel 3 near the frame members 2 a vertical row of screw hooks 5 is also provided. These are used for supporting the lettered cards 6, which may be constructed of laminated wood, card board or other suitable material, and which are provided with eyelets 7, adapting them to be removably engaged over the hooks 5. These eyelets 7 are ordinarily provided by making an aperture through one end of the card 6, but if desired the ordinary metal screw eyelets may be used. The letters and characters 8 may be either inscribed directly on the cards 6 or they may be printed on paper and pasted on.

A separate set of cards 9 is provided and on these cards, which are constructed in the same manner as the cards 6, but which are each painted a distinctive color, are inscribed the vowels of the alphabet.

Metal eyelets 10 are secured in the upper edge of the frame 2 to be used for securing a string or wire when the board 1 is hung on the wall.

The screw hooks 5 are each provided with a flange 11, which limits the penetration of the screw 12 into the panel 3.

The operation is as follows:

The instruction board is used in teaching letters and words to children just learning to read. The letters to be used are selected from the vertical rows and are hung from the hooks 5 on the horizontal strips 4. Various constructions of letters may be hung along the horizontal strips to form words and short sentences as the pupil progresses. In order to vary the work criss-cross combinations and vertical rows of words and characters may be arranged.

The vowels, which are fundamentally important in the learning of words, are each given a distinctive color so that the eye-picture of these letters will be impressed on the child's mind. These colored vowels constitute a separate set of letters so that both the colored and uncolored vowels may be used.

The hooks 5 are of such length that several letters may be hung over each other on the same hook. This makes possible the forming of several words from one original word by hanging new letters over certain ones in the original word. An example of this is that the hanging of the letter "Y" over the letter "N" in the word "man," as shown in Fig. 1, would change the word to "may." The various changes and combinations possible make the work interesting and the child is easily taught to read by the use of this instruction board.

I am aware that numerous details of construction may be varied through a wide range without departing from the principles of this invention, and I therefore do not purpose limiting the patent granted otherwise than necessitated by the prior art.

I claim as my invention:

1. In a display device, a board, a series of strips on said board, screw-hooks each passing through said strip into said board, and each having a shank projecting from said strip, the hooks on any one strip being equally spaced along said strip, a series of equal rectangular plaques each bearing indicia, the thickness of each plaque being less than half the length of one of said shanks, the width of each plaque being slightly less than the distance between neighboring hooks, each plaque having a hole near the middle of one end of suitable size to pass onto said hooks, the length of each plaque being slightly less than the distance between two strips.

2. In a display device, a board, a strip on said board, screw-hooks each passing through said strip into said board, and each having a shank projecting from said strip, said hooks being equally spaced along said strip, a series of equal rectangular plaques each bearing indicia, the thickness of each plaque being less than half the length of one of said shanks the width of each plaque being slightly less than the distance between neighboring hooks, each plaque having a hole near the middle of one end of suitable size to pass onto said hooks.

3. In a display device a series of plaques each bearing indicia and each having a hole, a support, a spacing strip on said support, a hook securing said strip to said support and projecting from said strip a greater distance than the combined thickness of a plurality of said plaques.

4. In an instruction device, a board, horizontal strips secured thereto, hooks on said strips, plaques bearing letters and having holes whereby they may be hung on said strips to form words, the hooks being of sufficient length to hold several plaques whereby the words may be readily changed by changing a single letter.

5. In a display device, a board, a series of horizontal strips on said board, screw-hooks each passing through said strips into said board, and each having a shank projecting from its strip, the hooks on any one strip being equally spaced along said strip, a series of equal rectangular plaques each bearing indicia, the thickness of each plaque being less than half the length of one of said shanks, the width of each plaque being slightly less than the distance between neighboring hooks, each plaque having a hole near the middle of one end of suitable size to pass onto said hooks, the length of each plaque being slightly less than the distance between two strips, an additional series of hooks on said board nearer the edge of the board than the hooks on said strips, certain of said plaques being hung on each of said last-named hooks, all the plaques on any one of said last-named hooks having the same letter thereon, and the letters being in alphabetical order along said last-named series of hooks.

6. In a display device, a board, a series of horizontal strips on said board, screw-hooks each passing through said strips into said board, and each having a shank projecting from its strip, the hooks on any one strip being equally spaced along said strip, a series of equal rectangular plaques each bearing indicia, the thickness of each plaque being less than half the length of one of said shanks, the width of each plaque being slightly less than the distance between neighboring hooks, each plaque having a hole near the middle of one end of suitable size to pass onto said hooks, the length of each plaque being slightly less than the distance between two strips, an additional series of hooks on said board nearer the edge of the board than the hooks on said strips, certain of said plaques being hung on each of said last-named hooks, all the plaques on any one of said last-named hooks having the same letter thereon, and the letters being in alphabetical order along said last-named series of hooks, and an extra series of hooks having plaques thereon, the letters on said extra hooks being all vowels, all the plaques on any one of said extra hooks being alike and the letters being in the alphabetical order of the vowels along said extra series of hooks.

7. In a display device, a board, a series of horizontal strips on said board, screwhooks each passing through said strips into said board, and each having a shank projecting from its strip, the hooks on any one strip being equally spaced along said strip, a series of equal rectangular plaques each bearing indicia, the thickness of each plaque being less than half the length of one of said shanks, the width of each plaque being slightly less than the distance between neighboring hooks, each plaque having a hole near the middle of one end of suitable size to pass onto said hooks, the length of each plaque being slightly less than the distance between two strips, an additional series of hooks on said board nearer the edge of the board than the hooks on said strips, certain of said plaques being hung on each of said last-named hooks, all the plaques on any one of said last-named hooks having the same letter thereon, and the letters being in alphabetical order along said last-named series of hooks, and an extra series of hooks having plaques thereon, the letters on said extra hooks being all vowels, all the plaques on any one of said extra hooks being alike and the letters being in the alphabetical order of the vowels along said extra series of hooks, the last-named plaques being distinctively colored, a different color for each vowel.

In testimony whereof I have hereunto subscribed my name in the presence of two subscribing witnesses.

CHRISTIAN F. HEINE.

Witnesses:
 CHARLES W. HILLS, Jr.,
 EARL M. HARDINE.